United States Patent Office 3,357,642
Patented Dec. 12, 1967

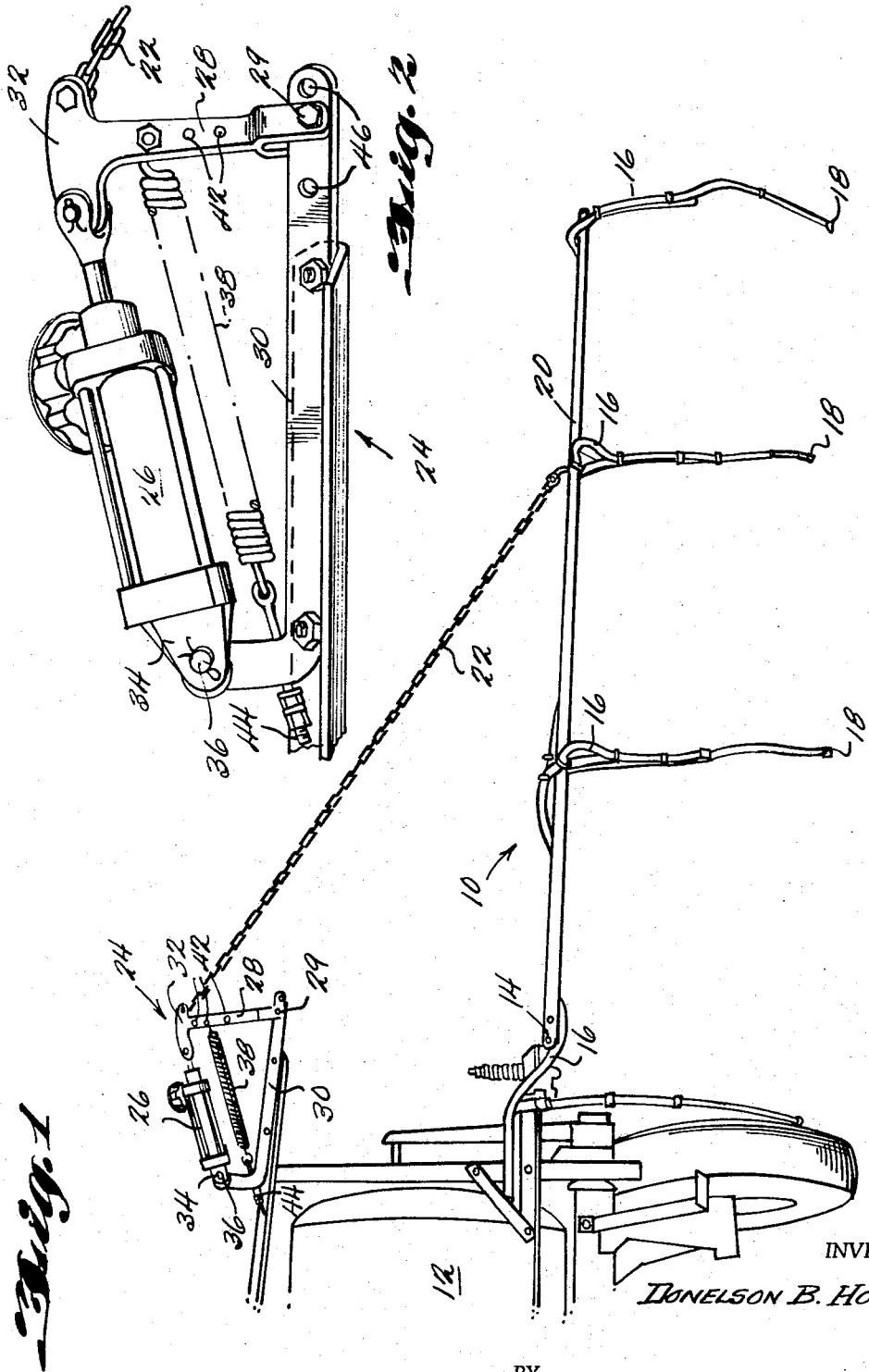

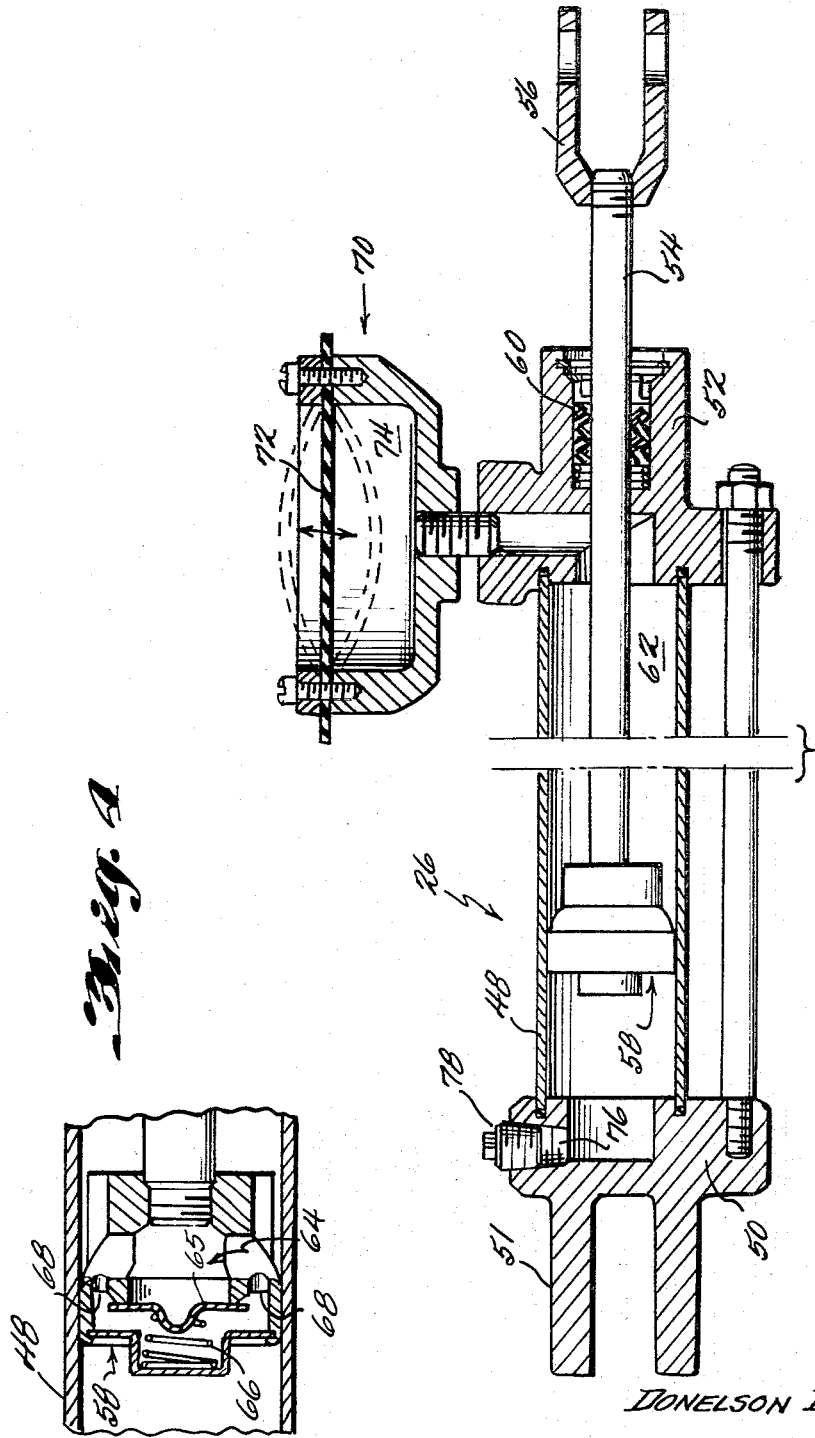

3,357,642
BOOM SUSPENSION DEVICE
Donelson B. Horton, Madison, Ala., assignor to John Blue Company, Incorporated, Huntsville, Ala., a corporation of Alabama
Filed Aug. 20, 1965, Ser. No. 481,273
6 Claims. (Cl. 239—159)

ABSTRACT OF THE DISCLOSURE

An improved boom suspension is provided wherein a non-rigid, flexible support is connected to the boom to permit up and down movements of the boom, and the flexible support means is further connected to a single-acting shock absorber which dampens upward movements of the boom. The flexible support may be a chain, and the single-acting shock absorber may be connected to the chain through a lever arm which is pivotally mounted in a frame for transmitting downward movements of the boom to an extending movement of the shock absorber. The lever arm may be adjustable as to its pivotal mounting relative to the shock absorber.

Brief description of invention

This invention relates to a boom suspension means and more particularly relates to a boom suspension device including a hydraulic shock absorber for preventing shocks to and uncontrolled movements of the boom.

It is a common practice in spraying liquid fertilizers and insecticides to utilize spray apparatus having a long boom to convey the liquid material for dispensing through a plurality of nozzles. Such apparatus is carried on a trailer or other vehicle so that the liquid material may be easily conveyed to the spray boom. Where the spray boom is relatively long, it is necessary to provide for a pivotal mounting of the base portion of the boom to the trailer or vehicle which carries the boom. The pivotal mounting allows the boom to swing up and down in a vertical plane, and spring means are associated with the pivotal mounting to return the boom to its normal horizontal dispensing position whenever it is moved away from that position. Such booms must be spring loaded and pivoted so that if one of the ground engaging wheels of the spraying vehicle drops into a low spot, the end of the boom may swing upwardly and avoid damage from striking the ground. The pivotal mounting permits the boom to swing upwardly away from the ground until the vehicle resumes its normal travel across level terrain.

A serious disadvantage in the conventional spring-mounted boom resides in its tendency to bounce up and down in an uncontrolled manner after the boom is initially displaced from its normal horizontal plane. Thus, if the moving spraying vehicle strikes a rock or other object, the impact on the wheel will cause the boom initially to swing downwardly and to then bounce upwardly. This bouncing movement imparts an inertia to the boom that continues as an oscillatory movement of the boom for a considerable distance beyond the point of impact. Such an uncontrolled bouncing movement is undesirable and seriously interferes with the dispensing of liquid material through the nozzles carried by a boom. This affects the thoroughness and evenness with which the ground is treated by such liquid material.

Attempts have been made to stabilize long booms by incorporating double acting shock absorbing devices in rigid suspension linkages which support the outer end of the boom. Such constructions do not allow the boom to swing upwardly rapidly in the event that the spray vehicle drops into a rut or low spot, and there is a definite likelihood of damage to the boom if it digs into the ground.

Accordingly, it is an object of the present invention to provide a suspension system which prevents excessive shock and mechanical loads on the boom arm, and which stabilizes the boom from bouncing up and down in an uncontrolled manner when the spray vehicle is riding over rough terrain. The suspension device of this invention includes a flexible support, such as a chain, which extends from an outer end of the boom arm to a frame structure located above the boom. The support chain is connected to a lever arm carried on the frame and the lever actuates a single-acting shock absorber and a spring means. The support chain provides sufficient flexibility to the suspension system so that the boom arm may be pivotally mounted to swing upwardly upon striking the ground or any other object. The lever arm is positioned to receive downward forces created by the boom arm on the suspension chain, and such forces act to extend the shock absorber to an operative position.

When using the suspension system of this invention, a spray vehicle may strike a rock and bounce upwardly to ride over the rock or other object. Because of the rapid upward movement of the vehicle, the boom arm will have a tendency to stay in its initial position momentarily, and as a result, the boom arm is pivoted downwardly relative to the vehicle. This movement of the boom arm causes an extension of the shock absorbing unit through the support chain which supports the boom arm. The shock absorbing unit is a single-acting unit arranged to move to an extended position rapidly and to retract very slowly with the assistance of a spring means. Thus, the initial upward movement of the vehicle, as it strikes an object, will cause a rapid extension of the shock absorber means by the downward forces applied to the associated support structure. From this position, the shock absorber means will retract slowly under the action of a spring; and this slow retraction will pull the boom arm upwardly and prevent it from oscillating in an uncontrolled manner.

It is also an object of this invention to provide a special shock absorber construction which is easily constructed and maintained and which is reliable in its rapid movement in one direction and its slow movement in the opposite direction. The shock absorber device includes a piston member mounted for reciprocation within a cylinder, and simple valving devices are provided in the piston to improve the movement of the piston through hydraulic fluid in one direction while impeding the movement of the piston in an opposite direction. A reservoir for hydraulic fluid is mounted externally of the shock absorber unit and includes an expansible chamber which accommodates varying quantities of hydraulic fluid to be relayed to the interior of the shock absorber.

The shock absorber is connected to the boom arm suspension means in a manner which protects the shock absorber from unusual movements of the boom arm and which applies forces to the shock absorber in a single axis which corresponds to the central axis for reciprocation of the piston member within the shock absorber cylinder.

The mounting means for the shock absorber is also provided with a spring device which tends to restrain downward movement of the boom arm, and the tension of the spring device can be easily adjusted to accommodate varying boom loads. Thus, the spring means prevents downward movement of the boom arm for all normal travel of the vehicle over the earth, but an extreme movement of the vehicle causes the spring tension to be overcome and the shock absorber to be extended.

These and other objects of this invention will become apparent in the more detailed discussion which follows; and in that discussion, reference will be made to the accompanying drawings in which:

FIGURE 1 is a perspective view of a spray boom arm as attached to a spray vehicle and showing the novel shock absorber suspension arrangement of this invention;

FIGURE 2 is a fragmentary view, on an enlarged scale, showing the support means for the shock absorber unit;

FIGURE 3 is a longitudinal sectional view of the shock absorber of FIGURE 2; and FIGURE 4 is a detailed sectional view of the piston means shown in FIGURE 3.

*Detailed description of invention*

Referring to FIGURE 1, a standard boom arm 10 is shown as attached to a spraying vehicle 12. The boom arm is pivotally mounted at its base portion to the vehicle at 14 so that it can swing up and down in a vertical plane about the axis of the pivotal mounting. This pivotal mounting of a boom arm is conventional, and is required to permit movement of the boom arm upwardly in the event that the outer end of the arm strikes the ground or any other object. The spraying vehicle 12 may include a tank for storing liquid material to be dispensed and connecting hoses 16 carry liquid material from the tank to a plurality of nozzles 18 which are spaced along the length of the boom arm 10. In this manner, liquid can be conveyed to spaced points along the boom arm for dispensing from a plurality of nozzles so that a broad area is covered for each trip of the spraying vehicle across a field.

The boom arm is supported at an outer portion 20 by a support chain 22 which limits downward movement for the boom arm and which maintains the arm at a normally horizontal plane. The support chain 22 is connected to an upper framework 24 above the boom arm, and the framework 24 includes mounting means for carrying a shock absorber unit 26. As can be seen in the figures, the weight of the boom arm is supported by the chain 22 and by a spring means carried by the upper framework 24, and not by the shock absorber unit. However, forces applied to the support chain 22 are relayed to the shock absorber unit through a lever arm 28 which is associated with the upper framework structure 24.

Referring to FIGURE 2, the lever arm 28 is shown as being pivotally mounted at 29 to a horizontal bar 30 of the upper framework 24. The lever arm is mounted to swing in a plane which is substantially common to the vertical plane in which the boom arm 10 can swing. One end of the support chain 22 is connected to an outer portion 20 of the boom arm, and the opposite end of the support chain is connected to an upper end 32 of the lever arm 28. The balanced position of the lever arm relative to the support chain and to the shock absorber prevents any of the weight of the boom arm from being supported by the shock absorber itself. The shock absorber 26 is also connected to the upper end 32 of the lever arm 28, and is arranged to extend and retract upon movement of the lever arm 28 about its pivotal axis 29 toward and away from the shock absorber unit. The movement of the lever arm 28 about its pivotal connection to the horizontal bar 30 assures an essentially straight line reciprocating movement toward and away from the shock absorber unit 26, and this prevents any lateral stresses from being applied to the components of the shock absorber unit. The shock absorber unit 24 is mounted at its base 34 to a lower part of the framework 24, and this base mounting includes a pin 36 or other device which permits a pivotal freedom of movement for the shock absorber about that mounting point.

The shock absorber 26 is designed to extend rapidly and to retract slowly so that downward forces on the support chain 22 will move the shock absorber to an extended position. A spring means 38 is connected between the lever arm 28 and a portion of the upper framework 24 so as to counteract the extending movement of the shock absorber. For all normal forces acting on the boom arm 10 the spring 38 will prevent an actuation of the shock absorber 26. However, when unusually severe forces act on the boom arm, as where the vehicle is riding over very rough terrain, the downward forces overcome the tension of the spring and extend the shock absorber to an operative position. As the shock absorber is extended by downward forces on the boom arm 10, the spring means 38 extends and increases its spring tension as it expands. Therefore, there is a tendency for the spring 38 to resist outward movement of the shock absorber, and to assist in the return of the shock absorber to a retracted position. As will be discussed later, valving means are included in the shock absorber to impede its retraction; but the spring 38 acts to assure the slow return of the shock absorber unit to a beginning position. Therefore, up and down movements of the boom arm in its vertical plane will be relayed through the support chain 22 to the lever arm 28, and the load of the boom arm will be carried by the lever arm as balanced by the spring means 28.

This feature of balancing the upright lever arm for pivotal movement has the advantage of taking normal load stresses of the boom arm off from the shock absorber unit 26 so that the shock absorber is actuated only when the boom arm is receiving an unusual force downwardly in its vertical plane. The lever arm 28 includes a plurality of mounting positions 42 for the spring 38. Thus, by stretching the spring 38 to a preselected mounting position 42, it can be determined how much tension will exist in the spring, and the spring means 38 can be used to accommodate varying sizes and weights of boom arms. The spring means 38 can also be adjusted by a turnbuckle adjustment means 44 which can be tightened and loosened to control the tension on the spring 38 for any of its mounted positions. It will be appreciated that the turnbuckle adjustment means 44 is also the means for anchoring the lower end of the spring 38 to the frame 24. The lever arm 28 can be further adjusted to accommodate varying length boom arms by changing the position of its pivotal axis 29. For this purpose, a plurality of holes 46 are provided in the horizontal bar 30 of the frame to permit the adjustment of the pivot point for the lever arm.

Looking to FIGURE 3, the single acting shock absorber is shown in detailed cross section as comprising a simplified construction which is reliable and which requires little maintenance or adjustment. The shock absorber 26 has a cylinder member 48 and an end plate 50 which closes one end of the cylinder and which carries a mounting bracket 51 for the lower end of the shock absorber. The opposite end of the cylinder 48 has an end element 52 which includes a bore through its central axis for allowing the reciprocation of the shaft 54 therethrough. The shaft 54 carries a mounting bracket 56 externally of the shock absorber unit, and a piston 58 is carried at the opposite end of the shaft for reciprocation within the cylinder 48. Suitable sealing means 60 are provided in the bore of the end plate 52 to permit reciprocation of the shaft through the bore without any loss of fluid from within the shock absorber cylinder. As is usual in shock absorber constructions, a fluid is contained within the cylinder chamber 62, and the piston member 58 is provided with valving means for allowing the passage of fluid through the piston.

Referring to FIGURE 4, the valving means of the shock absorber piston 58 is shown as including a main valve opening 64 which is opened only when the piston moves to the right, as viewed in FIGURES 3 and 4. The main valve 64 is opened when the valve plate member 65 is forced away from the valve opening by the pressure of hydraulic fluid pressing against the right-hand face of the plate 65. The plate 65 is normally held in a closed position by the spring element 66, until an extending movement of the shock absorber shaft 54 forces hydraulic fluid through the valve opening 64. For retracting movements of the shock absorber shaft 54, the plate 65 closes the main valve opening 64. This movement and the opening of the main valve 64 allows oil to pass from the right side of the piston to the left side of the piston, and the main valve opening is such that the movement can be made with very little resistance. Thus, the shock absorber piston can be moved to the right, in response to forces acting outwardly on the shaft 54, and this movement brings the shock absorber to an operative extended position.

When the shaft 54 and the piston 58 move to the left, the main valve 64 closes and the fluid which is contained within the shock absorber can only pass through the smaller openings 68. These openings are of a small enough size so that with the usual viscosity of oil used with the shock absorber, the return of the piston to the left is dampened by the relatively slow movement of the fluid through the openings 68. As the shock absorber piston moves to the right, the shaft 54 exits from the cylinder chamber 62, and this changes the volume of fluid required within the cylinder chamber.

In order that adjustments may be made in the fluid volume within the chamber 62, an expansible reservoir 70 is mounted externally of the shock absorber and in communication with the interior of the cylinder chamber 62. The reservoir unit 70 includes a flexible diaphragm means 72 which seals the reservoir and which can flex inwardly and outwardly relative to the reservoir of oil contained within a chamber 74, thus accommodating the varying volume requirements for fluid within the shock absorber unit itself. It would be possible to include an expansible reservoir chamber within the interior of the shock absorber cylinder 48; however, the construction shown in FIGURE 3 is preferred because it is more easily manufactured, and assembled. Additionally, the shock absorber unit as used with this invention will not be subjected to external abrasive forces, and the external mounting of a reservoir 70 does not impair the operability and long life of the shock absorber unit. A filler conduit 76 is provided at one end of the shock absorber for initially filling the unit with fluid, and a plug 78 seals the filler conduit during normal use of the shock absorber.

It is contemplated that variations in this invention will become apparent to those skilled in the art, and such variations are intended to be within the scope of this invention.

What is claimed is:
1. A suspension apparatus and spray boom comprising:
   means for pivotally connecting a base portion of said boom to spraying equipment so that the boom may swing up and down,
   a flexible, non-rigid support means connected to a terminal portion of said spray boom for supporting said boom at a normally horizontal level, and for connecting said spray boom to a shock absorbing means,
   shock absorbing means carried in a frame above the spray boom, said shock absorber means comprising a single-acting shock absorber having a piston within a cylinder, said piston being easily moved in one direction but impeded in movement in an opposite direction,
   means connecting said shock absorber means to said flexible support means, said connecting means having a lever arm mounted in said frame for relaying movements of the spray boom to the shock absorber means carried by the frame and, said lever being mounted at its base for pivotal swinging movement and being connected at an outer end to said shock absorber unit, whereby downward movements of said spray boom will act to extend said shock absorber means into an operative position.

2. The suspension apparatus of claim 1 wherein said lever arm is mounted for pivotal swinging movement in a vertical plane which is substantially common to the vertical plane of swinging movement for said spray boom.

3. The suspension apparatus of claim 1 wherein said lever arm is mounted with a spring means to maintain said shock absorber in a normally retracted position, whereby downward forces acting on said boom must be sufficient to overcome the tension of said spring means.

4. A suspension apparatus and boom arm comprising:
   means for pivotally connecting a base portion of said boom arm to a vehicle so that the boom arm may swing up and down,
   flexible, non-rigid support means connected to said boom arm and to said vehicle for supporting said boom arm at a normally horizontal level,
   said support means being attached to an upright lever arm mounted at its base for pivotal movement about a horizontal axis and, said lever arm being interconnected between said boom arm and a shock absorber means to receive downward forces from said boom arm, and
   single acting shock absorber means associated with said support means for dampening oscillations of said boom arm, said shock absorber means being extended into an operative position upon receiving downward forces from said boom arm, whereby downward movement of the boom arm will extend said shock absorber means and subsequent upward movement of the arm will be dampened by the shock absorber.

5. The suspension apparatus of claim 4 wherein said lever arm is mounted in combination with a spring means which maintains said shock absorber in a normally retracted position, whereby downward forces acting on said boom must be sufficient to overcome the tension of said spring means.

6. The suspension apparatus of claim 4 wherein said lever arm can be adjustably mounted to selected pivot points relative to said shock absorber for adjusting the angle and degree of forces acting on said shock absorber.

References Cited

UNITED STATES PATENTS

| | | |
|---|---|---|
| 1,909,768 | 5/1933 | Jones. |
| 2,371,705 | 3/1945 | O'Connor. |
| 2,548,209 | 4/1951 | Foster _____ 239—167 X |
| 2,605,135 | 7/1952 | Torgerson _____ 239—167 |
| 3,043,519 | 7/1962 | Tygart _____ 239—167 |

FOREIGN PATENTS 549,822  12/1957  Canada.

M. HENSON WOOD, Jr., *Primary Examiner.*
V. M. WIGMAN, *Assistant Examiner.*